United States Patent
Mondjian et al.

(10) Patent No.: US 6,503,447 B1
(45) Date of Patent: Jan. 7, 2003

(54) METHOD FOR PURIFYING GASEOUS EFFLUENTS BY MEANS OF PHOTOCATALYSIS, INSTALLATION FOR CARRYING OUT SAID METHOD

(75) Inventors: Pierre Mondjian, Vif (FR); Christine Nguyen Dinh An, Grenoble (FR); Françoise Delpech, Pontcharra (FR); Jean-Claude Roux, Meylan (FR); Sylvie Bourgeois, Dijon (FR); Alexis Steinbrunn, Asnieres les Dijon (FR); Pierre Pichat, Saint Didier au Mond d'or (FR); Jean Disdier, Caluire (FR); Estelle Mietton-Ceulemans, Poligny (FR); Léonie Bouvier, Beauvoir de Marc (FR); Joseph Dussaud, Vienne (FR); Pierre Girard, Saint Ismier (FR); Virginie Blondeau-Patissier, Pouilly les Vignes (FR)

(73) Assignee: Ahlstrom Paper Group Research and Competence Center (FR)

( * ) Notice: Subject to any disclaimer, the term of this patent is extended or adjusted under 35 U.S.C. 154(b) by 0 days.

(21) Appl. No.: 09/743,187

(22) PCT Filed: May 4, 2000

(86) PCT No.: PCT/FR00/01205

§ 371 (c)(1),
(2), (4) Date: Jan. 5, 2001

(87) PCT Pub. No.: WO00/72945

PCT Pub. Date: Dec. 7, 2000

(30) Foreign Application Priority Data

May 27, 1999 (FR) .............................. 99 06906

(51) Int. Cl.[7] ............................ A61L 9/00; G01N 21/01; G01N 23/00; A61N 5/00

(52) U.S. Cl. ............................. 422/4; 422/24; 422/306; 422/307; 250/432; 250/437; 250/455.11; 250/492.1; 250/504 R

(58) Field of Search ............................. 422/1, 4, 21–22, 422/24, 28–30, 32–33, 64, 88, 92–93, 120–125, 145, 168, 176–178, 181, 186, 186.3, 209–210, 224–225, 238–239, 292, 300, 305–307, 312, 900; 250/432, 436–438, 455.1, 492.1, 504 R

(56) References Cited

U.S. PATENT DOCUMENTS

| | | | |
|---|---|---|---|
| 4,277,938 A | * | 7/1981 | Belke et al. |
| 4,966,759 A | * | 10/1990 | Robertson et al. |
| 5,024,741 A | * | 6/1991 | Maya |
| 5,374,405 A | * | 12/1994 | Firnberg et al. |
| 5,543,016 A | * | 8/1996 | Fehlner et al. |
| 5,778,664 A | | 7/1998 | Exharos .................. 60/274 |
| 5,790,934 A | | 8/1998 | Say et al. ............... 422/186 |

FOREIGN PATENT DOCUMENTS

| | | |
|---|---|---|
| DE | 3642472 | 6/1988 |
| EP | 0 590 202 | 4/1994 |
| WO | 99/51345 | 10/1999 |

* cited by examiner

Primary Examiner—Robert J. Warden, Sr.
Assistant Examiner—Monzer R. Chorbaji
(74) Attorney, Agent, or Firm—Wall Marjama & Bilinski LLP

(57) ABSTRACT

Process for the purification of gaseous effluents by a photocatalytic reaction, according to which, under ultraviolet radiation in a single stage, the gaseous effluent is subjected to movements by which at least one first substrate is lapped and by which a second substrate is traversed, the said first substrate and the said second substrate being covered with at least one photocatalysing agent.

Plant for the implementation of the process.

13 Claims, 3 Drawing Sheets

METHOD FOR PURIFYING GASEOUS EFFLUENTS BY MEANS OF PHOTOCATALYSIS, INSTALLATION FOR CARRYING OUT SAID METHOD

BACKGROUND OF THE INVENTION

The invention relates to a process for the purification of gaseous effluents by photocatalysis. It also relates to the plant for the implementation of this process.

The reaction referred to as the photocatalytic reaction, also known as photocatalysis, consists in destroying the various organic and/or inorganic contaminants present in gaseous effluents and in particular the air by photochemical reaction, which is brought about by the irradiation of a catalyst under ultraviolet rays.

In essence, photocatalysis is initiated by activating a semi-conducting solid (photocatalyser, such as, for example, $TiO_2$) with UV radiation at a wavelength of less than 380 nanometers, resulting in electronic changes within the semiconductor and leading, in the presence of air or water, to the creation of oxygen-comprising radicals at the surface of the semiconductor. These radicals attack the organic or inorganic compounds adsorbed on the semiconductor and, by sequence of chemical reactions involving the oxygen of the air, decompose the compounds until the final stage of the oxidation is reached.

The present invention relates more particularly, but non-limitingly, to the purification of the air. This is because the air is capable of comprising a large number of contaminants, including $NO_x$, $NH_3$, $H_2S$, CO, $O_3$, chlorinated or nonchlorinated $C_2$-$C_4$ alkenes, chloromethane, isooctane, benzene, toluene, xylene, isopropylbenzene, saturated aliphatic $C_1$-$C_4$ alcohols, methyl mercaptan, chlorophenol, nitrophenol, methyl tert-butyl ether, dimethoxymethane, $C_1$-$C_4$ aldehydes, acetone, formic acid, acetic acid, 2-methylpropanoic acid, dichloroacetyl chloride, dimethylformamide, trimethylamine, acetonitrile, pyridine, methanethiol or dimethyl disulphide.

As already said, use may in particular, but non-limitingly, be made, as photocatalysing agent capable of triggering the photocatalytic reaction, of anatase titanium dioxide $TiO_2$, which, activated by UV light, is electronically modified so as to result in the formation of hydroxyl OH* and oxygen O* radicals capable of attacking the organic carbonaceous chains adsorbed on the $TiO_2$ by decomposing them until the organic carbon is completely converted into carbon dioxide. However, it is possible to envisage other photocatalysing agents, such as those given in the group consisting of metal oxides, alkaline earth metal oxides, actinide metal oxides and rare earth metal oxides.

In practice, the photocatalysing agents are attached to substrates by means of bonding agents, in particular cellulose fibre or synthetic nonwoven substrates or glass fibre substrates. Such combinations, also denoted by the term "filter media", are widely known and disclosed, for example, in the international patent application of the Applicant PCT/FR 99/00748.

These filter media can be employed in plants for the purification of air by photocatalytic reaction, such as that disclosed in the document U.S. Pat. No. 5,790,934. The reactor forming the subject-matter of this document exhibits a plurality of fibrous substrates coated with a photocatalytic composition, which substrates, under UV radiation, are lapped by the gaseous effluent to be purified. It is also specified that the light source is substantially perpendicular to the fibrous substrate.

Even if this type of reactor is relatively simple in its design, the degree of purification of the gaseous effluent remains relatively low. Thus, from Example 1, it is observed that the degree of conversion of the formaldehyde is only 65%.

SUMMARY OF THE INVENTION

In other words, the problem which the invention intends to solve is that of developing a process for the purification of gaseous effluents which is more efficient than those provided in the prior art.

Another problem which the invention intends to solve is that of providing a plant for the implementation of the process which is simple in its design.

Another objective of the invention is to provide a plant which can be easily installed in areas where contaminated air is given off.

To achieve this, the invention provides a process for the purification of gaseous effluents by a photocatalytic reaction, according to which, under ultraviolet radiation in a single stage, the gaseous effluent is subjected to movements by which at least one first substrate is lapped and by which a second substrate is traversed, the said first substrate and the said second substrate being covered with at least one photocatalysing agent.

In other words, the process of the invention consists in combining lapping and traversing movement by the gaseous effluent to be treated of substrates coated with a photocatalysing agent. This is because it has been observed that such a combination under ultraviolet radiation makes it possible to greatly increase the efficiency of the purification with respect to the lapping or traversing movement alone by the gaseous effluent of a substrate covered with photocatalytic agent.

According to how the gaseous effluent is directed, the said effluent will lap the first and second substrates and will then traverse the said second substrate.

According to another embodiment, the effluent will only lap the first substrate and will traverse the second.

As already said, the invention also relates to the plant for the implementation of this process. Such a plant can be designated by the term of photoreactor.

According to a first characteristic, the plant for the purification of gaseous effluents by a photocatalytic reaction comprises:

a source of ultraviolet radiation;
two concentric chambers, respectively:
an outer chamber, the internal face of the wall of which exhibits a substrate covered with at least one photocatalysing agent;
an inner chamber, the wall of which is perforated, the external face of the said wall exhibiting a substrate covered with at least one photocatalysing agent;
inlet means for the gaseous effluent to be purified;
outlet means for the purified gaseous effluent;
the gaseous effluent to be purified being directed so as to lap at least the internal face of the wall of the outer chamber and to traverse the wall of the inner chamber.

In an advantageous embodiment, each of the outer and inner chambers is cylindrical in shape.

Furthermore, in order to initiate and to enhance the speed of the photocatalytic reaction, the source of UV radiation is provided in the form of at least one tubular UV lamp positioned between the wall of the cylindrical outer chamber and the wall of the cylindrical inner chamber, parallel to the said walls.

In order to allow the effluent to be treated to enter the plant, the inlet means for the gaseous effluent are provided in the form of at least one opening inserted in one of the faces of the cylindrical outer chamber.

The said opening is advantageously equipped with an injector.

In a preferred embodiment, the inlet means for the gaseous effluent are provided in the form of twelve openings provided with injectors distributed evenly over one of the faces of the cylindrical outer chamber, so as to obtain a uniform distribution of the gaseous effluent within the said cylindrical outer chamber.

In contrast, in order to allow the purified air to exit, the outlet means for the gaseous effluent are provided in the form of at least one opening inserted in the opposing face of the cylindrical inner chamber.

In order to improve the convection of the gaseous effluent to be treated, at least one of the two cylindrical chambers is driven with a rotary motion. In that way, the effluent to be treated moves tangentially to the wall of the cylindrical outer chamber according to a turbulent and thus lapping movement, being able thus simultaneously to lap the wall of the cylindrical outer chamber and that of the cylindrical inner chamber and then, finally, to traverse the wall of the cylindrical inner chamber.

In a first embodiment, each of the two cylindrical chambers rotates in the same direction.

In a second embodiment, each of the two cylindrical chambers rotates in opposite directions.

In a third embodiment, a single cylindrical chamber rotates.

In order to accelerate the departure of the treated effluent, the plant can also be equipped with suction means. Any known suction means can be envisaged.

BRIEF DESCRIPTION OF THE DRAWINGS

The invention and the advantages which result therefrom will become more clearly apparent from the following implementational example, with the support of the appended figures.

DESCRIPTION OF THE INVENTION

Plant of the invention, also known as photoreactor

Figure 1:
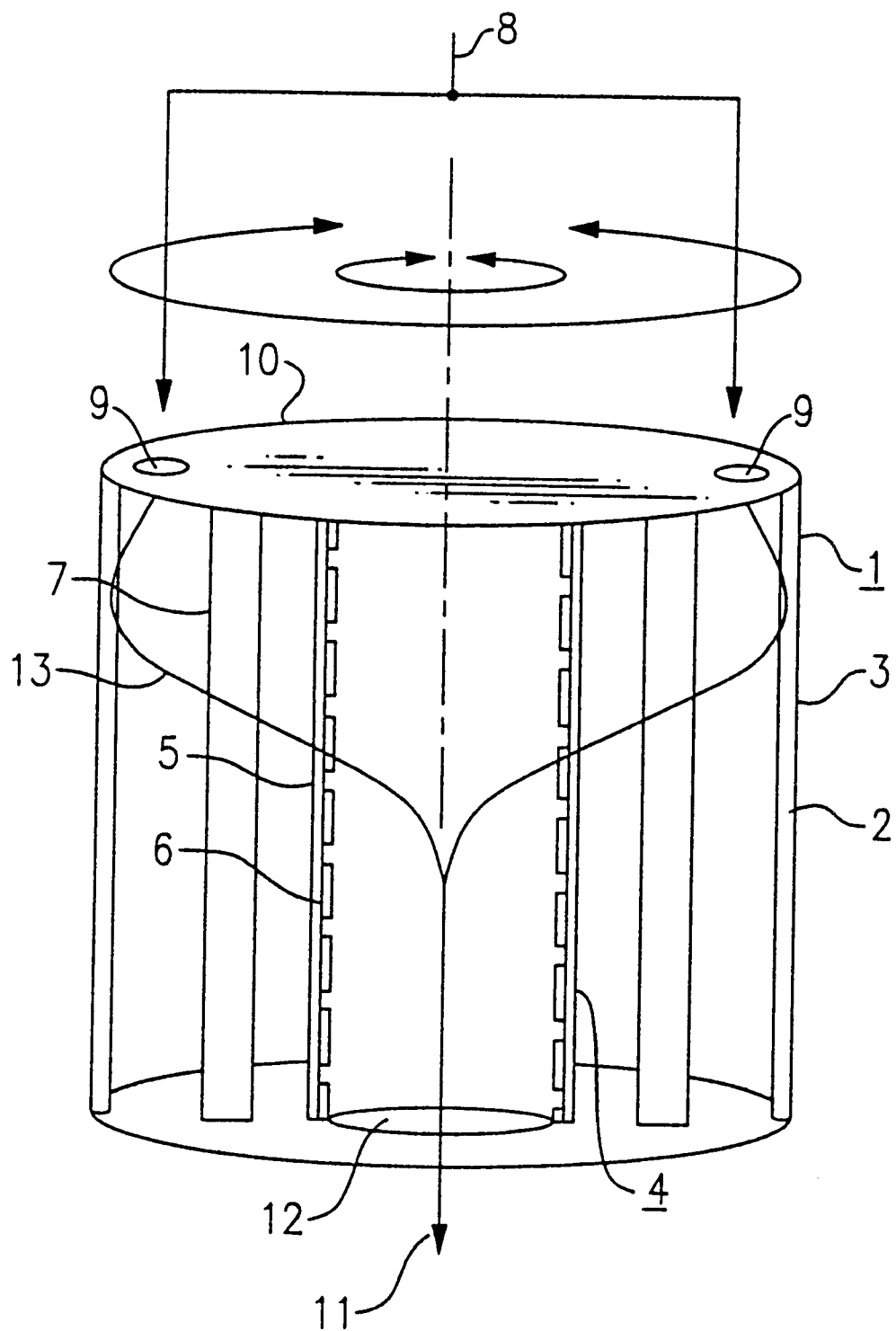
FIG. 1 is a diagrammatic representation of the plant of the invention.

The photoreactor of the invention, which has been represented in FIG. 1, comprises a cylindrical outer chamber (1), the internal face of the wall (2) of which exhibits a substrate covered with a photocatalysing agent (3), and a cylindrical inner chamber (4), the perforated wall (5) of which exhibits, on its external face, a substrate covered with a photocatalysing agent (6).

In practice, the attachment of the coated substrate (6) to the perforated wall (5) of the cylindrical chamber (4) is obtained by clamping a fixing bar to the appropriate shapes along a generatrix of the cylindrical chamber (4) and by gripping with the help of circular expansion joints at each end of the cylindrical chamber (4).

The attachment of the coated substrate (3) to the internal wall (2) of the cylindrical chamber (1) is obtained by gripping, in the lips of the leaktight seals, appropriate shapes of the cylindrical chamber (1).

The tubular UV lamps, which are also represented under reference (7), are positioned in the space separating the cylindrical outer chamber (1) from the cylindrical inner chamber (4) parallel to their wall. In practice, the UV lamps are distributed evenly at the same distance from the wall of the cylindrical outer chamber as from that of the cylindrical inner chamber.

In order to allow the entry of the contaminated effluent to be treated (8), two openings have been represented, referenced (9), inserted in the upper face (10) of the two concentric cylindrical chambers (1, 4) close to the periphery of the cylindrical outer chamber. It is also possible to envisage several openings distributed evenly close to the edge of the cylindrical outer chamber. The injectors are not represented.

In order to allow the departure of the treated effluent (11), an opening has been represented, referenced (12), on the opposing face of the cylindrical inner chamber.

In order to make possible the convection of the effluent to be treated, each of the two cylindrical chambers is driven with a rotary motion. In FIG. 1, the cylindrical chambers are represented as being able to rotate in both directions. It follows that the gas stream moves with a turbulent motion, lapping at least the internal surface of the wall of the cylindrical outer chamber, the gaseous effluent subsequently traversing the wall of the cylindrical inner chamber. A simplified representation of the path is plotted (13).

Pilot plant for treatment by photocatalysis

Figure 2:
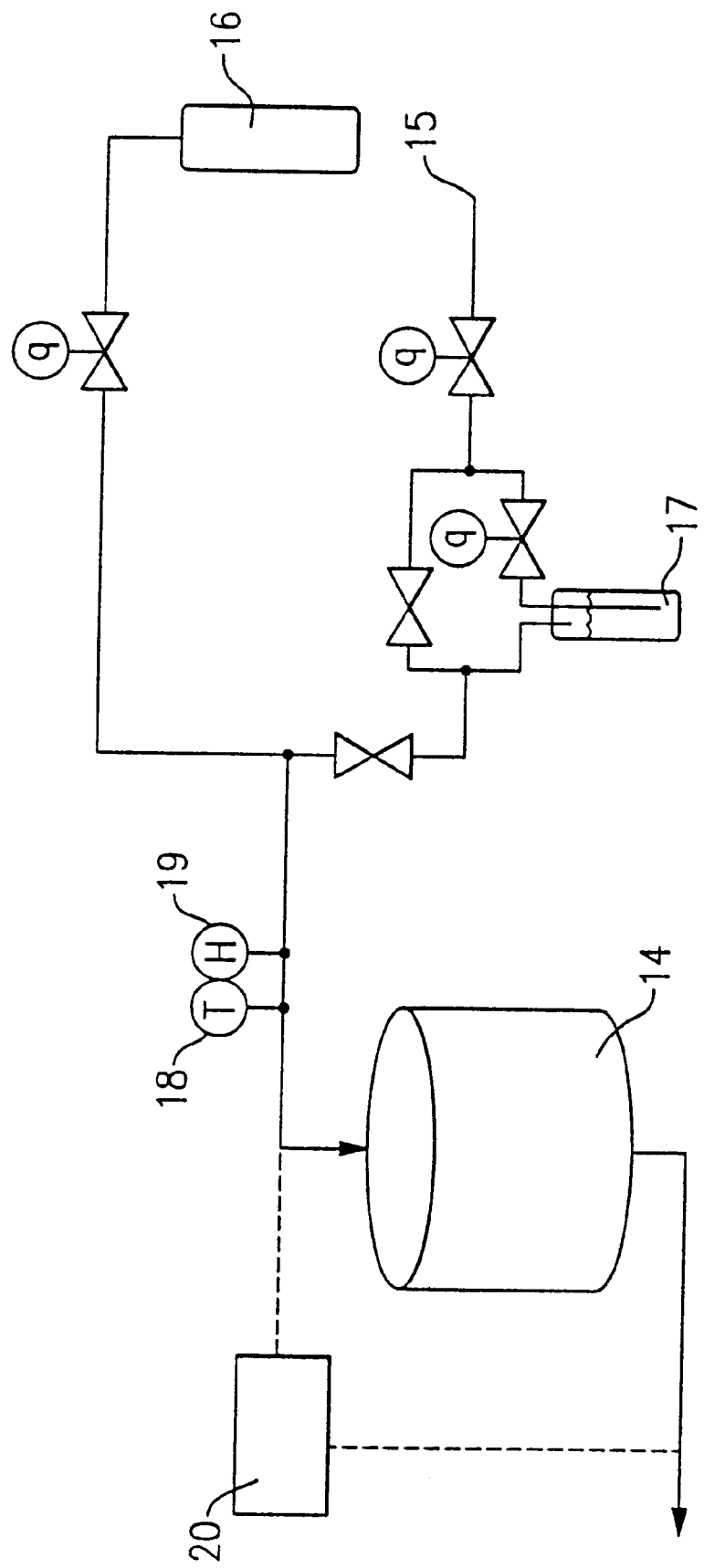
FIG. 2 is a diagrammatic representation of a pilot plant for the treatment of a gaseous effluent by photocatalysis.

A pilot plant for treatment by photocatalysis has been represented in FIG. 2, which pilot plant comprises a photoreactor of the invention, referenced (14), fed at its upper part with a mixture of air (15) and of gaseous effluent with a concentration of contaminant (16). The air can advantageously be humidified using a humidifier (17). A thermometer (18) and a hygrometer (19) are also provided on the circuit. The composition of the effluent before and after purification is studied by gas chromatography (20).

Tests carried out on the pilot treatment plant described above

The degree of removal of contaminant from a gaseous effluent composed of methanol and of air, in a proportion of approximately 238 ppmv of methanol, was evaluated using this pilot treatment plant, the composition of the gaseous effluent being represented in the table below.

TABLE 1

| | |
|---|---|
| $V_m$ (1 · mol$^{-1}$) | 24.07 |
| $C_i$ (ppmv) | ≈238 |
| M (g · mol$^{-1}$) | 32.04 |
| d (mg · l$^{-1}$) | 0.7915 |

$V_m$: Molar volume at 20° C. [L$^3$]
$C_i$: Concentration of the methanol at the inlet of the photoreactor [M · L$^{-3}$]
M: Molecular mass of methanol [M]
d: Density of methanol [M · L$^{-3}$]

The effluent with a concentration of methanol (16) is prepared by introducing liquid methanol into the chamber under a low pressure of 0.7 bar. The concentrated methanol is subsequently diluted in air (15), the relative humidity of the mixture obtained being given by the humidifier (17). The thermometer (18) and the hygrometer (19) measure the temperature and the relative humidity of the gaseous effluent in the plant.

The concentration of methanol is measured using a flame ionization detector.

The substrate covered with photocatalytic agent is a substrate made of glass fibers which is coated with a TiO$_2$ composition sold under the trade name Tiona PC 500. The glass fibers are coated in a proportion of 10 g/m² of $TiO_2$ per face.

The operating conditions are as follows:

relative humidity of the effluent at the inlet of the reactor 0% temperature 19 to 21° C.

number of lamps 0 or 12 opposing rotational speed ±25 rev/min a/ Demonstration of the Photocatalysis

Various experiments were carried out, referenced 1, 2, 3 and 4.

Experiment 1 was carried out without $TiO_2$ or UV (dilution)

Experiment 2 was carried out without $TiO_2$ with UV (photolysis)

Experiment 3 was carried out with $TiO_2$ without UV (adsorption)

Experiment 4 was carried out with $TiO_2$ and UV (photocatalysis)

Figure 3:
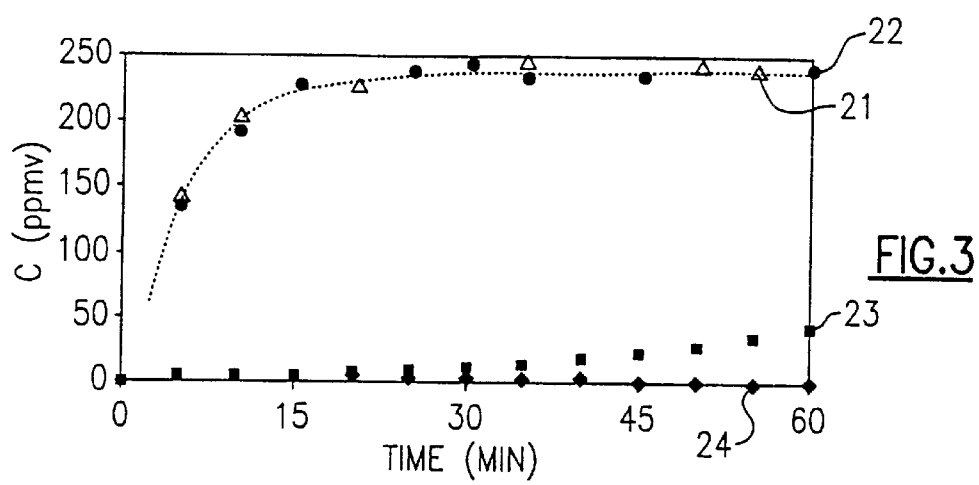
FIG. 3 is a representation of the concentration of methanol as a function of time after treatment in the pilot treatment plant in accordance with FIG. 2.

The concentration of methanol in the treated effluent as a function of time has been represented in FIG. 3.

As shown by the curves 21 (Experiment 2) and 22 (Experiment 1), it is found that there is no phenomenon of photocatalysis when the substrate is not coated with photo-catalysing agent.

The curve 23 (Experiment 3) shows the ability of the $TiO_2$ to adsorb the contaminant. Finally, the curve 24 (Experiment 4) shows the effectiveness under UV of the destruction of the contaminant by photocatalysis on $TiO_2$ and then of its destruction by photocatalysis. It is noted that the phenomenon of photocatalysis is rapid and complete.

b/ Influence on the Nature of the Contact of the Effluent on the Walls of the Photoreactor In this example, the contaminating effluent was subjected to three different courses:

a lapping treatment of the internal face of the wall of the outer chamber;

a treatment in which the wall of the inner chamber is traversed;

a lapping treatment of at least the internal face of the outer chamber and a treatment in which the wall of the inner chamber is traversed.

Figure 4:
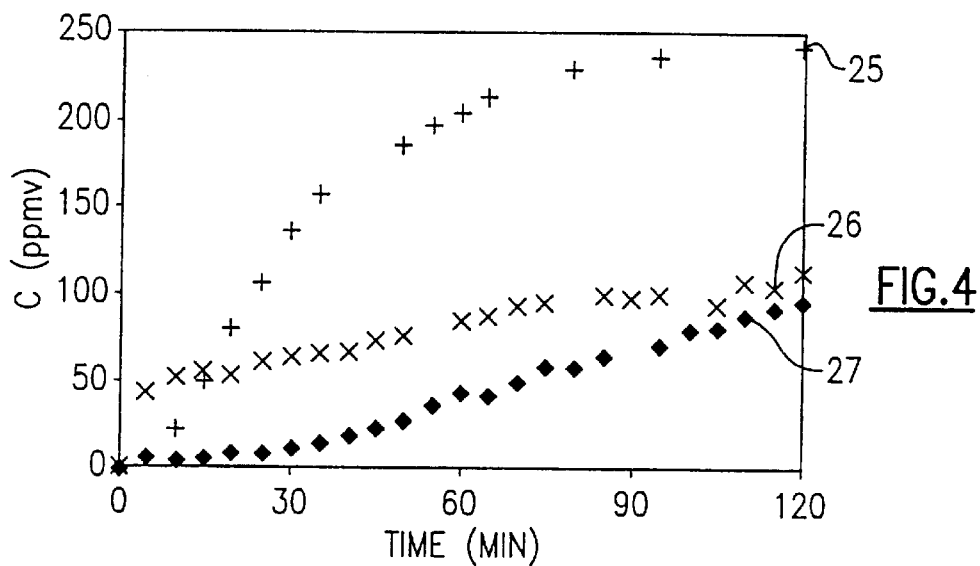
FIGS. 4 and 5 show the influence of the nature of the contact on the walls of the photoreactor of the gaseous effluent, first on the adsorption capacity of the photocatalysing agent and subsequently on the photocatalysis.

FIG. 4 shows the influence of the nature of the contact on the ability of the $TiO_2$ to adsorb the contaminant when the gaseous effluent is subjected to a traversing movement (curve 25), to a lapping movement (curve 26) or to the combination of the two movements (curve 27).

As shown by this figure, the substrate coated with $TiO_2$ is very rapidly saturated by the traversing movement alone, less rapidly by a simple lapping movement. On the other hand, saturation is very slow when the gaseous effluent is subjected to the combination of lapping and of traversing.

Figure 5:
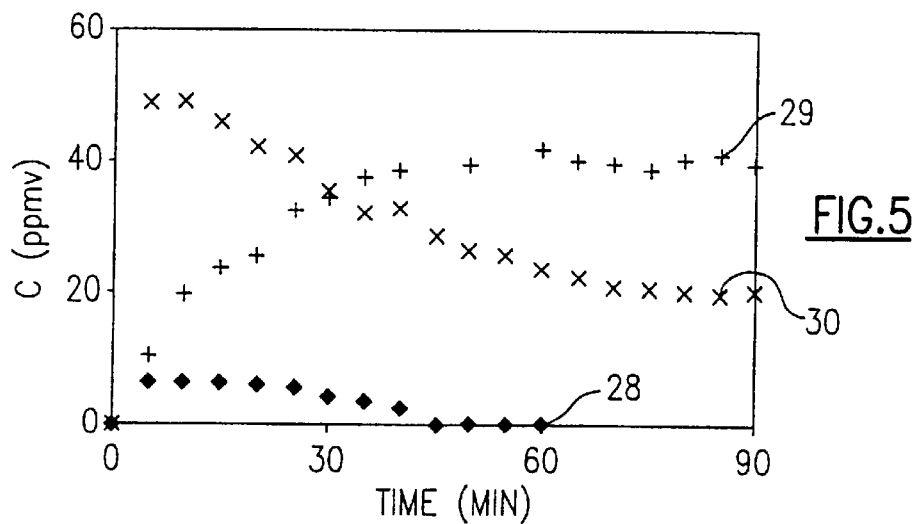

The photocatalysis of the gaseous effluent on the substrate coated with the photocatalytic agent has been represented in FIG. 5.

As shown by this figure, the combination of the lapping and of the traversing (curve 28) makes it possible to obtain a completely effective photocatalytic effect, whereas the simple traversing treatment (curve 29) or lapping treatment (curve 30) remains insufficient.

Of course, such a plant can be installed in any area capable of giving off contaminated gaseous effluents.

The invention and the advantages which result therefrom emerge clearly from the preceding description. In particular, the efficiency of the process for the purification of a gaseous effluent by combination of a lapping movement and of a traversing movement will be noted, as well as the simple design of the plant.

What is claimed is:

1. A method for the purification of a gaseous effluents by a photocatalytic reaction that includes the steps of:

coating a first substrate and a second substrate with a photocatalyzing agent, irradiating said substrates with ultraviolet radiation, causing a gaseous effluent to flow tangentially with regard to one of said coated substrates and transverse with respect to the other of said coated substrates.

2. The method of claim 1 wherein the gaseous effluent is caused to flow tangentially with respect to at least one of the substrates.

3. Apparatus for the purification to gaseous effluents that includes:

a first outer container and a second smaller inner container being mounted inside the outer container in coaxial alignment therewith to establish an outer chamber and an inner chamber, said outer container having an inside wall surface that is coated with a first photocatalyzing agent, said inner container having perforations form in the container wall and the outer surface of said wall being coated with a second photocatalyzing agent, a source for irradiating said first and second coatings with ultraviolet radiation, inlet means for introducing a gaseous effluent into said outer chamber so that the effluent initially flows tangentially with respect to said first photocatalyzing surface and then turns to flow transversely with respect to said second photocatalyzing surface into said inner chamber through said perforations; and outlet means in said inner chamber for discharging said gaseous effluent from said inner chamber.

4. The apparatus of claim 3 wherein said inner and outer containers are cylindrical in shape.

5. The apparatus of claim 4 wherein said irradiating source includes at least one tubular ultraviolet tube mounted within said outer chamber.

6. The apparatus of claim 4 that further includes a series of circumferentially spaced, axially disposed, UV lamp mounted within said outer chamber.

7. The apparatus of claim 4 wherein said containers are of equal length and further includes a pair of end walls for enclosing said containers and said inlet means includes an opening in one end wall that is located adjacent to the periphery of said first coating.

8. The apparatus of claim 7 wherein said outlet means includes an opening in the other end wall.

9. The apparatus of claim 4 that further includes a drive means for rotating one of said cylinders.

10. The apparatus of claim 4 that further includes a drive means for rotating both cylinders.

11. The apparatus of claim 10 wherein said drive means is adapted to rotate said cylinders in the same direction.

12. The apparatus of claim 10 wherein the drive means is arranged to rotate the cylinders in opposite directions.

13. The apparatus of claim 3 that further includes a suction means for drawing a gaseous influent through the outer and inner chambers.

* * * * *